Oct. 24, 1944.　　　A. FOSDAL　　　2,360,832

DENTAL CHUCK

Filed Oct. 25, 1943

Inventor
Alfred Fosdal
By
Glenn L. Fish
Attorney

Patented Oct. 24, 1944

2,360,832

UNITED STATES PATENT OFFICE 2,360,832

DENTAL CHUCK

Alfred Fosdal, Farragut, Idaho

Application October 25, 1943, Serial No. 507,564

1 Claim. (Cl. 32—27)

This invention relates to a dental chuck and it is one object of the invention to provide a chuck of such formation that wear may be compensated for and a sleeve or socket in which the burr fits held against longitudinal movement, thus establishing proper engagement of a gear about the sleeve with a gear or pinion carried by a drive shaft.

Another object of the invention is to provide the casing of the chuck with a cap at one end which is threaded into the casing and may be easily adjusted or entirely removed when cleaning or repairs to the chuck are necessary.

Another object of the invention is to provide the chuck with a slidable latch movable into and out of position to engage in a slot formed in a burr and securely but releasably hold the burr in the sleeve.

Another object of the invention is to provide the casing with a cap for its upper end which is removably held in place so that by removing the cap the latch may be allied when assembling the chuck or removed when necessary.

Figure 1:
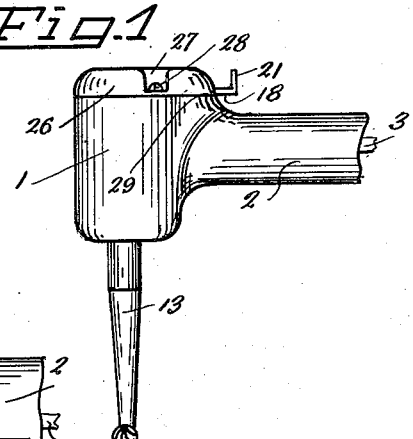
Fig. 1 is a side elevation of the improved dental chuck.
Figure 2:
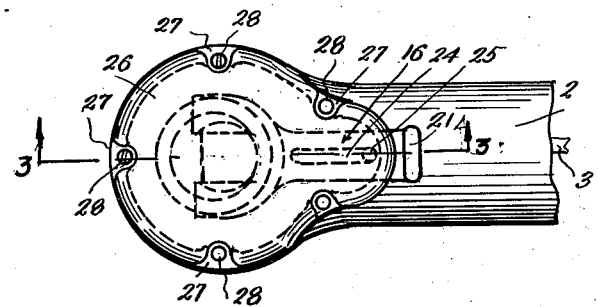
Fig. 2 is a top plan view thereof.
Figure 3:
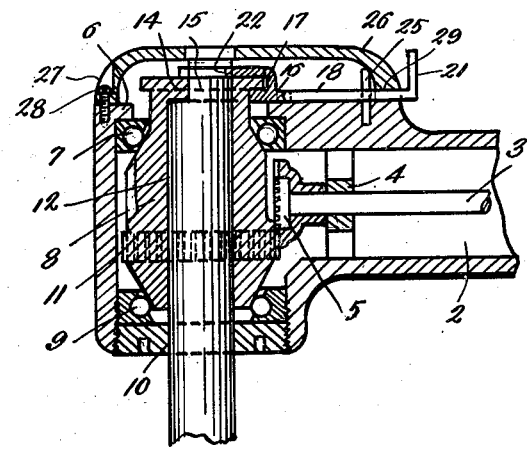
Fig. 3 is a sectional view taken vertically through the chuck on the line 3—3 of Fig. 2.

This improved chuck has a casing 1 formed of metal and having a shank 2 which is tubular and will have its rear end provided with conventional means for connecting the shank with the casing of a power shaft by which rotary motion is imparted to the drive shaft 3 of the chuck. This shaft extends longitudinally through the shank and is rotatably mounted through a suitable number of bearings 4, the shaft being provided at its front end with a gear or pinion 5 having contact with the bearing at the front end of the shank.

The casing is open at its top and bottom and about its upper end is formed with an annular flange 6 constituting an abutment for a bearing 7 surrounding the upper portion of a socket or sleeve 8. This socket or sleeve is inserted in the casing through the lower end thereof, which lower end is internally threaded, and, after the socket has been inserted, a lower bearing 9 is inserted and secured in contacting engagement with the socket by a retainer ring 10 which is screwed into the casing. By so mounting the socket and the bearings the ring may be adjusted and the socket shifted longitudinally to hold the gear 11 surrounding the socket in meshing engagement with teeth of the gear 5. It will thus be seen that if the teeth of the gears 5 or 11 become worn to such an extent that the gears have a tendency to slip, this wear may be compensated for and the chuck restored to working condition and use of the chuck may be continued instead of it being necessary to throw it away.

Figure 4:
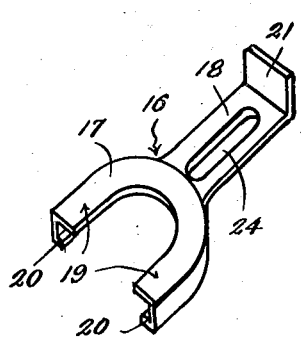
Fig. 4 is a perspective view of the latch.

The socket or sleeve 8 is formed with a longitudinal bore 12 to receive the burr or drill 13 and, at its upper end, the bore communicates with an offset flat-sided opening 14 to receive a correspondingly shaped extension 15 of the drill. Since the flat-sized extension of the drill fits into the opening 14 of the socket, the drill turns with the socket. The drill must be prevented from slipping out of the socket and in order to accomplish this, there has been provided a latch or keeper 16 which is formed as shown in Fig. 4, and has a U-shaped portion 17 from which extends a stem or shank 18. The U-shaped portion of the latch has upper and lower flanges 19 and 20 and when the latch is shifted inwardly by pressure applied to the upturned outer end or lip 21 of the shank, the upper flange 19 will engage in a groove 22 formed about the extension while the lower flange 20 engages under an annular flange 23 formed about the upper end of the socket 8. Therefore, the latch or keeper 16 serves to support the socket and also serves to prevent the drill from slipping out of the socket. A slot 24 extends longitudinally of the shank 18 to receive a pin 25 which limits longitudinal shifting of the latch.

In order to close the upper end of the casing, there has been provided a cap 26 which has depending marginal portions so that the cap may enclose the upper portion of the socket 8 projecting from the casing and also enclose the latch when the cap is applied to the casing. Referring to Fig. 1, it will be seen that the cap has its rear portion of reduced width and that about its margin the cap is formed with seats 27 to receive the heads of screws 28 by means of which the cap is firmly but detachably held in place upon the casing. The rear extension of the cap is formed in the lower edge face of its downwardly extending marginal portion with a notch or recess to receive the shank of the latch. When the cap is removed, the latch will be exposed and may be very easily removed and repaired or a new latch applied.

Having thus described the invention, what is claimed is:

A chuck comprising a cylindrical casing open at its upper and lower ends and formed with an internal shoulder about its upper end, the lower end of the casing being internally threaded, a drive shaft rotatably mounted radially of the casing intermediate ends thereof, a gear at the inner end of said shaft, a rotatable socket in said casing extending longitudinally thereof, an upper bearing ring in said casing abutting said flange and surrounding said socket, a gear about said socket meshing with the gear of the drive shaft, a lower bearing ring screwed into the lower end of the casing and surrounding the socket, a closure ring screwed into the lower end of said casing and constituting a lock nut for the lower bearing ring, said socket having its upper end protruding from the upper end of the casing and formed with an outstanding annular flange above the casing, a latch slidably mounted on the upper end of said casing and having a U-shaped portion straddling the upper end of the socket and formed with upper and lower flanges between which the flange of the socket fits, said latch having a shank formed with a longitudinal slot and having its outer and bent to form an upstanding lip, a pin carried by said casing and passing through the slot to guide and limit movement of the latch, and a removable cap for the upper end of said casing formed with a passage through which the shank of the latch passes.

ALFRED FOSDAL.